United States Patent
Omori

(10) Patent No.: US 7,836,327 B2
(45) Date of Patent: Nov. 16, 2010

(54) SIGNAL PROCESSING CIRCUIT FOR ACCESSING A MEMORY BASED ON ADJUSTABLE MEMORY CONTROL CLOCK

(75) Inventor: Nobuhiko Omori, Gyoda (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 560 days.

(21) Appl. No.: 11/955,192

(22) Filed: Dec. 12, 2007

(65) Prior Publication Data

US 2008/0148092 A1   Jun. 19, 2008

(30) Foreign Application Priority Data

Dec. 14, 2006   (JP) .............................. 2006-336541

(51) Int. Cl.
G06F 1/04 (2006.01)
(52) U.S. Cl. .................. 713/600; 713/503; 711/167
(58) Field of Classification Search .................. 713/503, 713/600; 711/167; 365/189.011
See application file for complete search history.

(56) References Cited

U.S. PATENT DOCUMENTS

| 5,608,896 | A  | * | 3/1997  | Vogley ........................ 713/503 |
| 7,085,905 | B2 | * | 8/2006  | Chao .......................... 711/167 |
| 7,257,725 | B2 | * | 8/2007  | Osaka et al. ................. 713/500 |
| 7,444,535 | B2 | * | 10/2008 | Hsieh et al. ................. 713/600 |
| 7,519,788 | B2 | * | 4/2009  | LaBerge ...................... 711/167 |

* cited by examiner

Primary Examiner—Thuan N Du
(74) Attorney, Agent, or Firm—Osha • Liang LLP

(57) ABSTRACT

A delay time of a reference clock CLK is changed to generate a memory control clock CLKd, a data value output from a write data generating section is written in a memory based on the memory control clock CLKd, while successively changing the delay time of the memory control clock CLKd with respect to the reference clock CLK, the data value written in the memory is read, and the delay time suitable for access to the memory is selected from the delay time of the memory control clock CLKd with respect to the reference clock CLK based on a comparison result of the data values.

2 Claims, 5 Drawing Sheets

| TIMING CHANGE SIGNAL | DELAY TIME | OUTPUT | COMPARISON RESULT |
|---|---|---|---|
| 1 | t1 | MEMORY 30a | 50% |
| 2 | t1 | MEMORY 30b | 80% |
| 3 | t2 | MEMORY 30a | 100% |
| 4 | t2 | MEMORY 30b | 100% |
| 5 | t3 | MEMORY 30a | 100% |
| 6 | t3 | MEMORY 30b | 100% |
| 7 | t4 | MEMORY 30a | 100% |
| 8 | t4 | MEMORY 30b | 80% |
| 9 | t5 | MEMORY 30a | 70% |
| 10 | t5 | MEMORY 30b | 50% |
| 11 | t6 | MEMORY 30a | 40% |
| 12 | t6 | MEMORY 30b | 20% |

Fig. 5

SIGNAL PROCESSING CIRCUIT FOR ACCESSING A MEMORY BASED ON ADJUSTABLE MEMORY CONTROL CLOCK

CROSS-REFERENCE TO RELATED APPLICATIONS

The entire disclosure of Japanese Patent Application No. 2006-336541 filed on Dec. 14, 2006 including specification, claims, drawings, and abstract is incorporated herein by references.

BACKGROUND OF THE INVENTION

1. Field of the Invention

The present invention relates to a signal processing circuit capable of accessing an external memory.

2. Description of the Related Art

With a signal processing circuit, a memory is externally connected to transmit and receive data to and from the external memory, whereby the data can be processed. In such a system, timing for transmitting and receiving the data between an interface of the signal processing circuit and the external memory needs to be adjusted. At this time, an integrated circuit constituting the signal processing circuit has fluctuation in characteristics, and hence the timing with respect to the external memory is adjusted for each signal processing circuit.

However, with increased speed of the data processing, increased speed of access between the interface of the signal processing circuit and the external memory is also required, and it becomes difficult to adjust the timing of the access.

For example, even in a case where the timing with respect to the external memory can be adjusted from the viewpoint of design of the signal processing circuit, it sometimes becomes difficult to adjust the timing of the access to the external memory owing to an influence of actual layout of the circuit. Fluctuation in characteristics of the respective external memories similarly influences the timing adjustment.

Furthermore, the layout of a substrate on which the signal processing circuit and the external memory are mounted, fluctuations of other external peripheral devices and a power circuit, and the like, influence the timing adjustment of the access between the signal processing circuit and the external memory.

SUMMARY OF THE INVENTION

According to one aspect of the present invention, there is provided a signal processing circuit which is connected to a memory where data is written and read based on a memory control clock, and which processes a signal based on a reference clock, the signal processing circuit comprising a timing adjustment section which changes a delay time of the memory control clock generated by delaying the reference clock, to output the memory control clock to the memory; a write data generating section which outputs, to the memory, a predetermined data value to be written in the memory; and a read comparison section which reads a data value stored in the memory to compare the data value with the predetermined data value, the signal processing circuit being configured to execute writing processing to write the data value output from the write data generating section in the memory based on the memory control clock, while the timing adjustment section successively changes the delay time of the memory control clock with respect to the reference clock, and reading processing to read the data value written in the memory by the writing processing, and being configured to select a delay time suitable for access to the memory from the delay time of the memory control clock with respect to the reference clock, based on a result of the comparison between the data value read by the reading processing and the predetermined data value in the read comparison section.

BRIEF DESCRIPTION OF THE DRAWINGS

Preferred embodiments of the present invention will be described in detail based on the following drawings, wherein:

FIG. 5 is an explanatory view of a selection method of an optimum timing according to the embodiment of the present invention.

DESCRIPTION OF THE PREFERRED EMBODIMENT

[Circuit Constitution]

Figure 1:
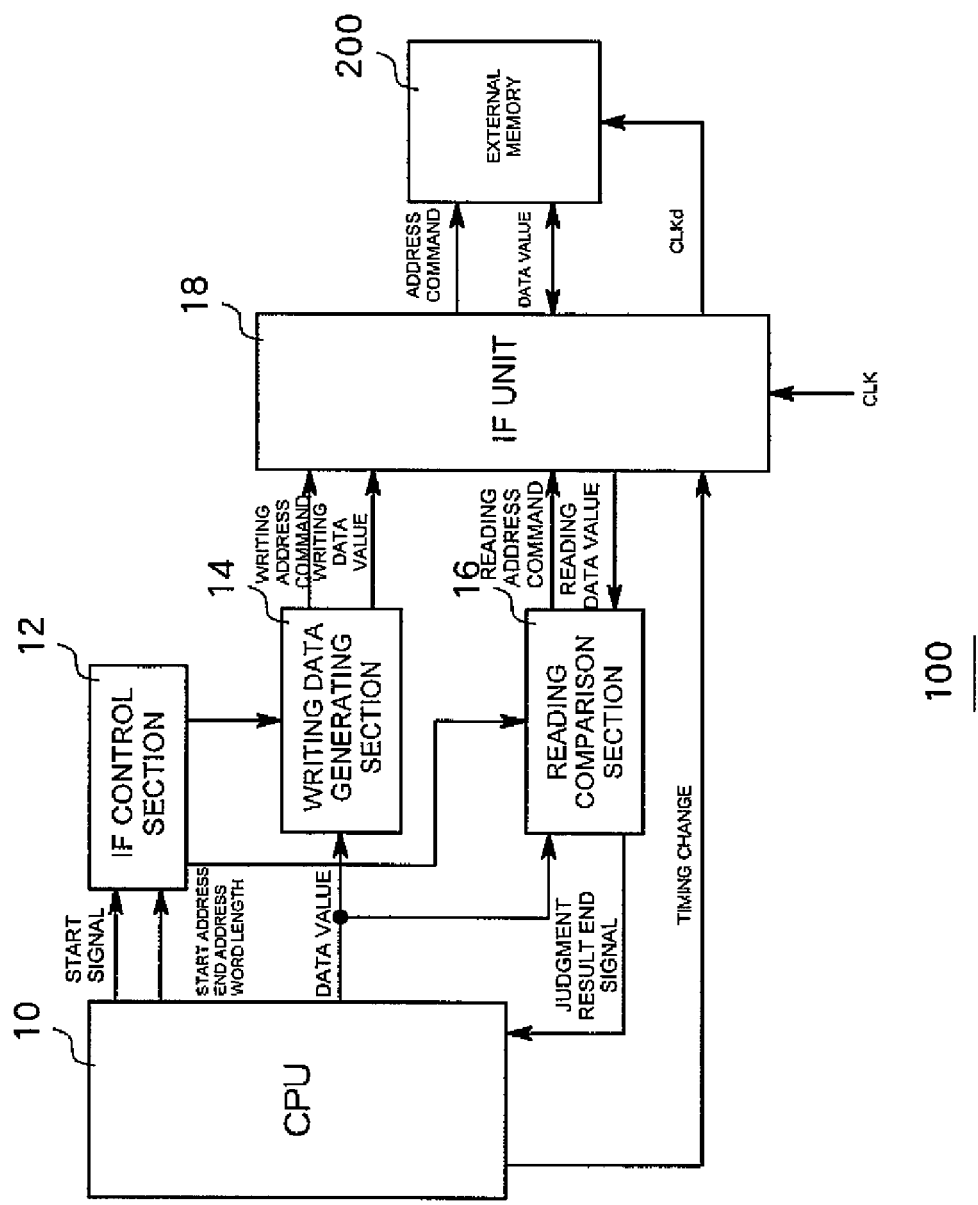
FIG. 1 is a block diagram showing a constitution of a signal processing circuit according to an embodiment of the present invention.

A signal processing circuit 100 according to an embodiment of the present invention includes a central processing unit (CPU) 10, an interface control section 12, a write data generating section 14, a read comparison section 16 and an interface unit 18. The signal processing circuit 100 is connected to an external memory (an SDRAM or the like) 200 provided at an external position of the circuit via the interface unit 18 so that data can be transmitted and received therebetween.

The central processing unit (CPU) 10 systematically controls the whole signal processing circuit 100. The central processing unit 10 outputs, to the interface control section 12, information such as a start signal indicating start of timing adjustment and a start address, an end address and a test data word length for the timing adjustment. Furthermore, a data value for use in test of the timing adjustment is output to the write data generating section 14 and the read comparison section 16. Moreover, a timing change signal for adjusting a timing for writing the data in the external memory 200 and a timing for reading the data from the external memory 200 is output to the interface unit 18.

The interface control section 12 controls adjustment processing of a timing of access between the signal processing circuit 100 and the external memory 200. The interface control section 12 receives the start address and the end address, and then receives the word length from the central processing unit 10. Afterwards, the interface control section 12 further receives the start signal from the central processing unit 10, and then outputs the start address, the end address and the word length to the write data generating section 14. Afterwards, the interface control section 12 raises a write request signal to request the write data generating section 14 to write a data value. In consequence, the write data generating section 14 writes the data value in the external memory 200 via the interface unit 18. The interface control section 12 outputs the start address, the end address and the word length to the read comparison section 16. Furthermore, after ending the writing processing, the interface control section 12 raises a read request signal to request reading of the data value into the read comparison section 16. In consequence, the data value test written in a memory space from the start address to the end address in the external memory 200 is read.

After receiving the start address, the end address and the word length from the interface control section 12, the write data generating section 14 stores them, in an internal memory thereof, as a start address, an end address and a word length for writing the data value on trial in the external memory 200 connected to the interface unit 18. Then, the write data generating section 14 receives the data value from the central processing unit 10, and stores it, in the internal memory, as a data value to be written on trial in the external memory 200 connected to the interface unit 18.

After receiving a write request signal from the interface control section 12, the write data generating section 14 outputs a write command for setting the external memory 200 to a writing mode to the interface unit 18 in accordance with a rise timing of a reference clock CLK. In consequence, the external memory 200 is set to the writing mode. Subsequently, the write data generating section 14 outputs a set data value and a set start address to the interface unit 18 in accordance with the rise timing of the reference clock CLK. Afterwards, every time the reference clock CLK rises, the write data generating section 14 successively outputs the address as a writing processing target to the interface unit 18 until the set end address is reached, while increasing the address as much as a set word length from the set start address.

After receiving the start address, the end address and the word length from the interface control section 12, the read comparison section 16 stores them in an internal memory thereof, as a start address, an end address and a word length for reading the data value on trial from the external memory 200 connected to the interface unit 18. Then, the read comparison section 16 receives the data value from the central processing unit 10, and stores it, in the internal memory, as a reference data value to be compared with the data value read from the external memory 200 connected to the interface unit 18.

After receiving the read request signal from the interface control section 12, the read comparison section 16 outputs, to the interface unit 18, a read command for setting the external memory 200 to a reading mode, in accordance with the rise timing of the reference clock CLK. In consequence, when the external memory 200 is set to the reading mode, the set start address is output to the interface unit 18, as an address which is a reading processing target in accordance with the rise timing of the reference clock CLK. Subsequently, every time the reference clock CLK rises, the read comparison section 16 successively outputs the address as the reading processing target to the interface unit 18 until the set end address is reached, while increasing the address as much as the set word length from the set start address. The address is set to the interface unit 18 in this manner, whereby the data value is read from a memory space corresponding to the address in the external memory 200.

The read comparison section 16 compares the read data value with the stored reference data value to judge whether or not these values match each other. The read comparison section 16 outputs the judgment result to the central processing unit 10.

Figure 2:
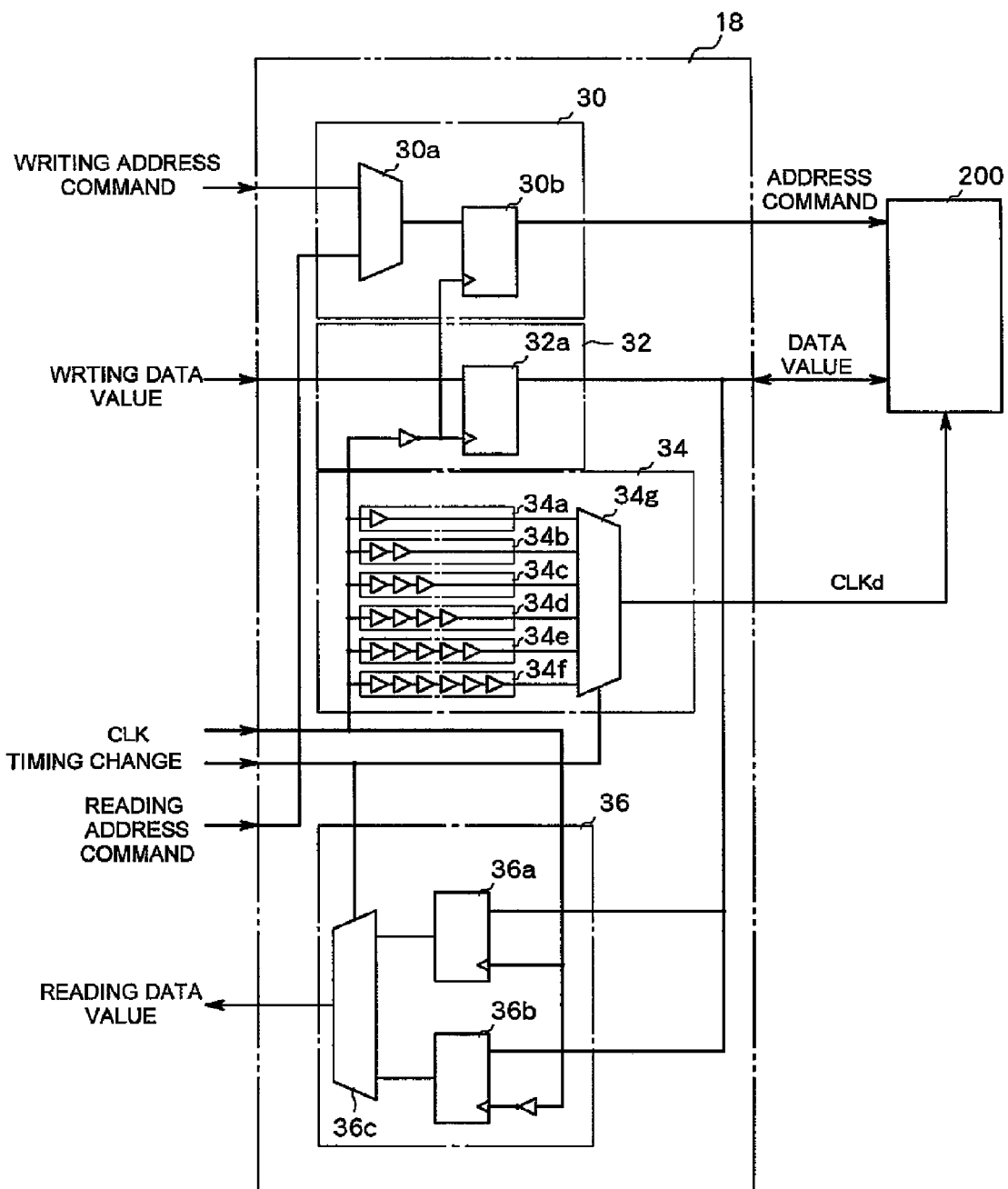
FIG. 2 is a diagram showing a constitution of an interface unit according to the embodiment of the present invention.

As shown in FIG. 2, the interface unit 18 includes a command setting section 30, a data setting section 32, a timing adjustment section 34 and a data reading section 36. The interface unit 18 is a constituent unit electrically connected to the external memory 200.

The command setting section 30 includes a multiplexer 30a and a data latch 30b. When the write command or a write target address is input from the write data generating section 14, the multiplexer 30a outputs the command or the address to the data latch 30b. Alternatively, when the read command or a read target address is input from the read comparison section 16, the multiplexer 30a outputs the command or the address to the data latch 30b. The data latch 30b receives the reference clock CLK via an inverter to hold the command or the address input from the multiplexer 30a at a falling timing of a reference clock CLK, and then the data latch 30b outputs it as a command or an address for controlling the external memory 200 to the external memory 200.

The data setting section 32 includes a data latch 32a. When the data latch 32a receives the reference clock CLK via the inverter to hold the data value input from the write data generating section 14 at a falling timing of the reference clock CLK, the data latch 32a outputs the data value as a write target to the external memory 200.

Figure 3:
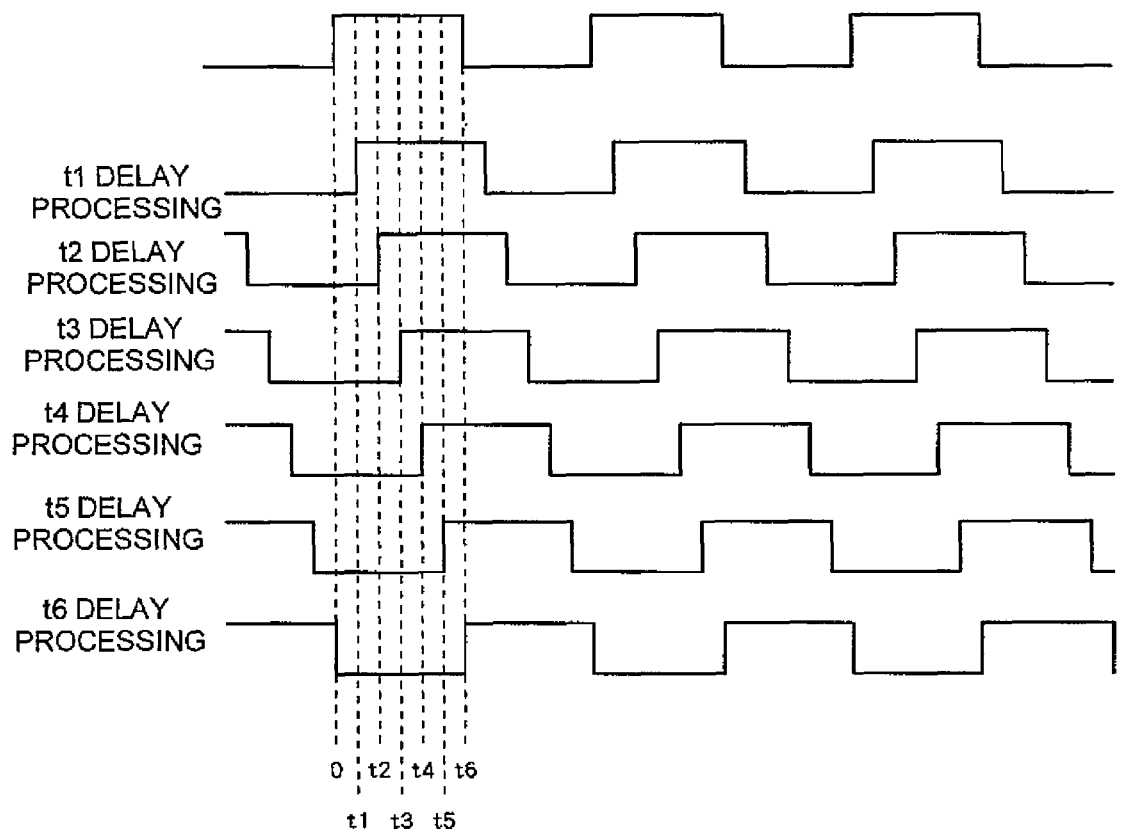
FIG. 3 is an explanatory view of a timing adjustment method according to the embodiment of the present invention.

The timing adjustment section 34 includes delay circuits 34a, 34b, 34c, 34d, 34e and 34f and a multiplexer 34g. In the present embodiment, the delay time is changed in six steps. The delay circuits 34a, 34b, 34c, 34d, 34e and 34f include different numbers of buffer elements, respectively. The delay circuits 34a, 34b, 34c, 34d, 34e and 34f delay the reference clock CLK input from the outside as much as delay times t1, t2, t3, t4, t5 and t6 which are different from each other, to output the delayed clock to the multiplexer 34g. As shown in FIG. 3, each of the delay times t1, t2, t3, t4, t5 and t6 is a time delayed from the rise timing of the reference clock CLK as much as a time obtained by dividing a half period of the reference clock CLK by the number of the delay circuits included in the timing adjustment section 34.

The multiplexer 34g receives the timing change signal from the central processing unit 10, and outputs a clock CLKd delayed as much as the delay time based on the timing change signal. For example, the multiplexer 34g selects the delay circuit 34a in a case where the timing change signal is 1 or 2, selects the delay circuit 34b in a case where the timing change signal is 3 or 4, selects the delay circuit 34c in a case where the timing change signal is 5 or 6, selects the delay circuit 34d in a case where the timing change signal is 7 or 8, selects the delay circuit 34e in a case where the timing change signal is 9 or 10, and selects the delay circuit 34f in a case where the timing change signal is 11 or 12. In consequence, the clock CLKd supplied to the external memory 200 can successively be delayed as much as the delay times t1, t2, t3, t4, t5 and t6 in response to the timing change signal.

The data reading section 36 includes data latch es 36a, 36b and a multiplexer 36c. The data latch 36a directly receives the reference clock CLK input from the outside, holds the data value read from the external memory 200 at a timing corresponding to the rising of the reference clock, and outputs the data value to the multiplexer 36c. The data latch 36b receives the reference clock CLK input from the outside via the inverter, holds the data value read from the external memory 200 at a timing corresponding to the falling of the reference clock, and outputs the data value to the multiplexer 36c.

The multiplexer 36c receives the timing change signal from the central processing unit 10, and outputs the data value output from the data latches 36a, 36b to the read comparison section 16 based on the timing change signal. For example, the multiplexer 34g selects the output of the data latch 36a in a case where the timing change signal is an odd number, and selects the output of the data latch 36b in a case where the timing change signal is an even number. In consequence, the data values read from the external memory 200 at different timings can be output to the read comparison section 16.

The external memory 200 includes a semiconductor memory device. For example, the external memory 200 may be an SDRAM or the like. When the write command is input into an address bus at the timing of the clock CLKd supplied from the outside, the external memory 200 stores and holds the data value to be supplied to a data bus in a memory space corresponding to the address subsequently input into the address bus. When the read command is input into the address bus at the timing of the clock CLKd supplied from the outside, the external memory 200 outputs, to the data bus, the data value held in the memory space corresponding to the address subsequently input to the address bus.

[Processing]

Figure 4:
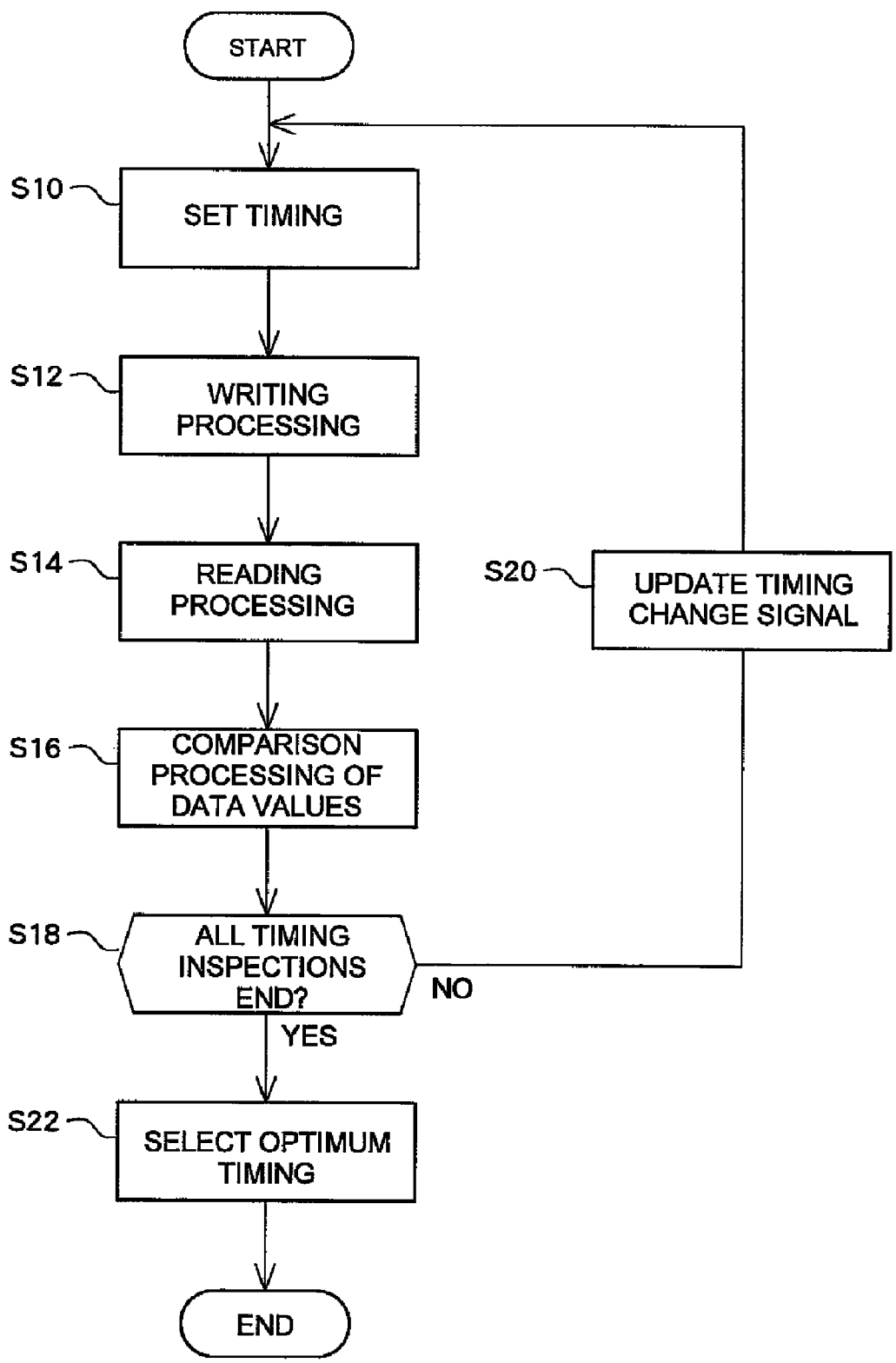
FIG. 4 is a flow chart of the timing adjustment method according to the embodiment of the present invention.

Timing adjustment processing performed by the signal processing circuit 100 will hereinafter be described with reference to a flow chart of FIG. 4. It is preferable that the following processing is automatically started, for example, when a sensor function of detecting that the external memory 200 is connected to the interface unit 18 is separately mounted and the interface unit 18 is connected to the external memory 200.

It is to be noted that there start addresses, the end addresses and the word lengths are set beforehand, as well as the data values to be transmitted from the central processing unit 10 to the write data generating section 14 and the read comparison section 16.

In step S10, the delay time of the clock CLKd to be supplied to the external memory 200 is updated. The central processing unit 10 outputs the timing change signal to the interface unit 18. The interface unit 18 sets the delay time of the clock CLKd in the timing adjustment section 34 to one of the times t1, t2, t3, t4, t5 and t6 from the reference clock CLK in accordance with the value of the timing change signal. In consequence, the clock CLKd delayed as much as the set delay time from the reference clock CLK is supplied from the interface unit 18 to the external memory 200. The data reading section 36 of the interface unit 18 selects one of the outputs of the data latches 36*a*, 36*b* in accordance with the value of the timing change signal.

In the present embodiment, an initial value of the timing change signal is set to 1. When the processing of the step S10 is first performed, the delay time of the clock CLKd is set to the time t1, and the data latch 36*a* is selected in the data reading section 36.

Afterwards, every time the value of the timing change signal is increased in step S20, the delay time of the clock CLKd is set to the time t1 and the data latch 36*b* is selected in the data reading section 36, the delay time of the clock CLKd is set to the time t2 and the data latch 36*a* is selected in the data reading section 36, . . . , whereby the timings of the writing processing and the reading processing are successively changed.

In step S12, the data value is written. The central processing unit 10 outputs the start signal to the interface control section 12. In response to this start signal, a writing start signal is input from the interface control section 12 into the write data generating section 14. After receiving the writing start signal, the write data generating section 14 outputs the write command to the interface unit 18. The interface unit 18 sets the write command to the data latch 30*b* of the command setting section 30 at the fall of the reference clock CLK, and the command setting section 30 outputs the write command to the external memory 200. In consequence, the external memory 200 is set to the writing mode.

Subsequently, the preset start address and data value are input from the write data generating section 14 into the interface unit 18. In the interface unit 18, at the fall of the reference clock CLK, the start address is set in the command setting section 30, and the start address is output to the external memory 200. The data value is set in the data setting section 32, and the data value is output to the external memory 200. The external memory 200 receives the delayed clock CLKd input from the interface unit 18, and writes the data value input from the interface unit 18 in a memory space specified by the start address input from the interface unit 18 in accordance with the timing of the rise of the clock CLKd.

Every time the reference clock CLK rises, the write data generating section 14 sets the address in the interface unit 18, while increasing the address every preset word length to the end address. In consequence, the predetermined data value is stored in the memory space from the start address to the end address in the external memory 200.

At this time, the processing is performed in response to the reference clock CLK which is not delayed in the signal processing circuit 100, whereas the writing processing is performed in response to the clock CLKd delayed from the reference clock CLK as much as the delay time set in the step S10 in the external memory 200.

In step S14, the data value is read. After the end of the writing processing of the data, the interface control section 12 inputs a reading start signal into the read comparison section 16. After receiving the reading start signal, the read comparison section 16 outputs the read command to the interface unit 18. In the interface unit 18, at the fall of the reference clock CLK, the read command is sent to the data latch 30*b* of the command setting section 30, and the read command is output from the command setting section 30 to the external memory 200. In consequence, the external memory 200 is set to the reading mode.

Subsequently, the preset start address is input from the read comparison section 16 into the interface unit 18. In the interface unit 18, at the fall of the reference clock CLK, the start address is set in the data latch 30*b* of the command setting section 30, and the start address is output from the command setting section 30 to the external memory 200. The external memory 200 receives the delayed clock CLKd input from the interface unit 18, and reads the data value stored in the memory space specified by the start address input from the interface unit 18 in accordance with the timing of the rising of the clock CLKd. The read data value is input into the data reading section 36.

Every time the reference clock CLK rises, the data reading section 36 sets the address to the interface unit 18, while increasing the address every preset word length up to the end address. In consequence, the data value stored in the memory space from the start address to the end address in the external memory 200 is successively read, and input into the data reading section 36. In the data reading section 36, the data value is stored in the data latch 36*a* at a time when the reference clock CLK rises (rising timing), and the data value is stored in the data latch 30*b* at a time when the reference clock CLK falls (falling timing). Then, the data value output from one of the data latches 36*a*, 36*b* selected in the step S10 is output to the read comparison section 16.

In step S16, the data values are compared. The read comparison section 16 compares the preset data value from the central processing unit 10 with the data value read from the external memory 200 in the step S14 to judge whether or not these values match each other. The read comparison section 16 obtains a ratio at which each data value read from the memory space from the start address to the end address matches the preset reference data value to output the ratio as a comparison result to the central processing unit 10.

For example, in a case where data values FF are written into the memory space from the start address to the end address five times in the step S12, when FF, F5, FF, FF and FF are read in the step S14, a matching ratio between the read data value and the reference data value is 4/5=80%.

It is judged in step S18 whether or not the trial writing processing and reading processing have been performed at all settable timings. The central processing unit 10 judges whether or not inspections of the timings of the writing processing and the reading processing have been ended with respect to all the values that can be taken by the timing change signal.

The central processing unit 10 advances the processing to step S22 in a case where the inspections have been ended with respect to all of the delay time of the clock CLKd and the data latches 36*a*, 36*b*. If not, the central processing unit increases the value of the timing change signal by 1 in the step S20 to return the processing to the step S10.

In the step S22, suitable timings are set for both the writing processing and the reading processing based on the comparison result. Here, timings such that the writing processing and the reading processing can be provided with the most allowance are selected.

For example, in a case where the comparison result is obtained with respect to the timings of the writing processing and the reading processing as shown in FIG. 5, it is preferable to select an intermediate timing from the timings at which the matching ratio becomes the maximum value. In FIG. 5, when the timing change signal is 3, 4, 5, 6 or 7, the matching ratio becomes the maximum value of 100%. Therefore, it is supposed that when the timing change signal as an intermediate point of these timings is 5, the writing processing and the reading processing are provided with the most processing allowances. Therefore, it is preferable to select a timing when the timing change signal is 5, that is, the delay time is t3 and the reading data is stored in the data latch 36*a*.

It is to be noted that a selection method of the timing is not limited to this method as long as a probability of success in the writing processing and the reading processing is a predetermined value or more. For example, in FIG. 5, the matching ratio with respect to each timing may be fitted to an approximated curve, and a timing closest to the maximum value on the resultant approximated curve may be selected.

As described above, according to the present embodiment, the timing of the access to the external memory can be automatically and appropriately adjusted. The above timing adjustment function can be used in an interface with all memories, but can be used as the timing adjustment function even in, for example, an interface between a master LSI and a slave LSI, except the memories. In this case, responses from the slave LSI to the master LSI are compared, whereby the access timing can be automatically and appropriately adjusted.

What is claimed is:

1. A signal processing circuit which processes a signal based on a reference clock,
    the signal processing circuit being connected to a memory in which data is written and read based on a memory control clock,
    the signal processing circuit comprising:
    a timing adjustment section which changes a delay time of the memory control clock generated by delaying the reference clock, to output the memory control clock to the memory;
    a write data generating section which outputs, to the memory, a predetermined data value to be written in the memory; and
    a read comparison section which reads a data value stored in the memory to compare the data value with the predetermined data value,
    the signal processing circuit being configured to execute writing processing to write the data value output from the write data generating section in the memory based on the memory control clock, while the timing adjustment section successively changes the delay time of the memory control clock with respect to the reference clock, and reading processing to read the data value written in the memory by the writing processing, and being configured to select a delay time suitable for access to the memory from the delay time of the memory control clock with respect to the reference clock, based on a result of the comparison between the data value read by the reading processing and the predetermined data value in the read comparison section.

2. The signal processing circuit according to claim 1, wherein the read comparison section obtains a matching ratio between the data value read in the reading processing and the predetermined data value, and
    selects, as the delay time suitable for the access to the memory, an intermediate point of the delay time of the memory control clock with respect to the reference clock at a time when the matching ratio is highest.

* * * * *